United States Patent [19]  [11] 3,770,469
Kapolyi et al.  [45] Nov. 6, 1973

[54] PROCESS FOR PREPARING SELF-DISINTEGRATING PRODUCTS CONTAINING DICALCIUM SILICATE

[75] Inventors: László Kapolyi, Budapest; Ferenc Lázár, Tatabanya; György Vámos, Tatabanya; Béla Galauner, Tatabanya, all of Hungary

[73] Assignee: Tatabanyai Szenbanyak, Tatabanya, Hungary

[22] Filed: Apr. 1, 1971

[21] Appl. No.: 130,513

[30] Foreign Application Priority Data
Apr. 6, 1970 Hungary .............................. TA-1055

[52] U.S. Cl. ............................................... 106/120
[51] Int. Cl. ............................................... C04b 1/00
[58] Field of Search .................... 106/120, 100, 102, 106/103

[56] References Cited
FOREIGN PATENTS OR APPLICATIONS
938,761  10/1963  Great Britain ...................... 106/100

Primary Examiner—James E. Poer

[57] ABSTRACT

To the starting material containing at least 10 percent of $SiO_2$ and 25 percent of $Al_2O_3$, limestone and small quantities of metallic desoxidants are admixed, and having been clinkerized at a temperature of 1,250° to 1,420°C it is cooled abruptly with air and/or water to a temperature of about 700°C. The extracted product can be used for alumina production, the residue for cement production.

5 Claims, No Drawings

PROCESS FOR PREPARING SELF-DISINTEGRATING PRODUCTS CONTAINING DICALCIUM SILICATE

The present invention is related to a process for preparing of self-disintegrating dicalcium silicate or of products containing the same material for use in the manufacture of aluminum and hydraulic cement.

It is well known that poor quality bauxite ores or materials having a low $Al_2O_3$ content and high $SiO_2$ content are not suited for the production of aluminum in accordance with the Bayer-process. However, the extraction of the aluminum content of such aluminum poor ores or materials is a technical problem of great importance, because these materials are available in large quantities. Waste materials as coal slags, fly ashes, bituminous shales, red mud, clays etc. contain considerable quantities of aluminum. Processes aiming at the extraction of aluminum content of similar raw materials are well known, but they proved mostly uneconomical in the practice, although they are linked with the production of other useful substances, for instance with the production of cements in addition to aluminum.

It is well known that clinker sintered together with lime in the production of portland cement in certain cases disintegrates during storage. This phenomenon is due to the fact that from the $\alpha\alpha'\beta$ and $\gamma'$ modifications of the dicalcium sliicate ($2CaO \cdot SiO_2$) the $\alpha'\beta$ and $\gamma'$ modifications which are interchangeable in the temperature range of sintering and cooling, will predominate in the material.

The most important transformation from the point of view of self-desintegration is the one from $\beta$ to $\gamma'$ since thereby the change of a crystal symmetry is accompanied by a volume increase of 10 percent. The system not being capable of deformations to this extent, this volume increase creates a stress within the material, that actually blows up the existing crystal structure, and the clinker disintegrates to a very fine powder mostly having grain sizes of 10 to 20 microns. Disintegration, however, occurs only at a temperature of 400°C, instead of the theoretical value of 675°C, because the influences of different inhibiting factors cause changes in thermodynamic conditions.

Such a inhibiting factor, partly or completely stopping self-distinegration, is the phenomenon according to which during cooling the $\alpha'$ modification partly or completely passes over to the $\gamma'$ one, omitting the $\beta$ state. This transition can take place under the same crystal symmetry and the volume change being of smaller dimensions than that of the $\beta \rightarrow \gamma'$ transition, self-disintegration does not take place in this case. From the cement manufacturing point of view, disaggregation is disadvantageous or even harmful, because the $\gamma'$ modification has no effect upon hydraulic setting strength and consequently it cannot be used directly as a hydraulic cement. The self-disintegrating property of the dicalcium silicate for alumina production is however very advantageous because the grinding of the material, one of the most power consuming operations, can be eliminated. Carrying self-disintegration out with the best possible efficiency will be very important.

A preliminary condition to this is that the silicon content of the system should be transformed completely into dicalcium silicate, and that tricalcium silicate (a-lite) should not form even in small quantities the latter compound being one of the inhibitors of the $\beta \rightarrow \gamma'$ transition. To ensure this, molar proportions of calcium oxide/silica should be adjusted to 1.9–2.2, and a heat treatment in the temperature range of 1250°–1450°C should be carried out for a required period. When adjusting the CaO/SiO ratio other components of the raw material which are capable to react with lime or substituting the same must be taken into consideration as well.

Dicalcium silicate having been formed all factors hindering the fast and efficient formation of the $\gamma$ modification must be eliminated in order to promote self-disintegration. In order to ensure this circumstance oxides with the oxidation values 4–5–6–7 present in the material to be treated in small quantities ($Cr^{VI}$, $As^{V}$, $Mn^{VII}$, $Te^{VI}$, $P^{V}$, $Ge^{IV}$, $V^{V}$) should be reduced to lower valences. This is necessary, because ions having a high oxidation value have very high ionic potentials owing to their small ion radii, their electrostatic effect comes fully into play even at low concentrations and hinders polymorphous transformation. The same applies to $C^{IV}$, which has a still higher ionic potential than the other ions.

There are many well known processes based on the above recognition partly in the field of the manufacture of portland cement, partly in the production of aluminum. For example, German Patent No. 1,020,612 deals with the production of alumina and of portland-cement starting from a clinker of containing self-distegrating dicalcium silicate.

One feature of the present invention is producing materials containing dicalcium silicate, by means of an economical process starting with materials containing different aluminum and silicon compounds, by a process which results in the formation of dicalcium silicate having a self-disintegrating character. The aluminum content of the product, after transformed into a water-soluble modification, can be extracted without grinding. Another feature of the present invention is to enable the utilization of raw materials heretofore having been considered unsuitable for the point of view of the Bayer-process for alumina and dicalcium silicate production.

According to a known process the reduction of the ions inhibiting the desired $\alpha'-\beta-\gamma$ transformation of the dicalcium silicate to be treated i.e., eliminating their stabilizing effect on the $\beta$-modification, can be accomplished by adding carbonaceous material to the raw material to be clinkerized at the high temperature of the sintering procedure, and exposing it to the action of water at the temperature of about 1,250°C. The resulting gas mixture comprising CO and $H_2$, is reducing the oxides of high oxidation values. This process, however, involves technological difficulties restraining the possibility of industrial realization. Thus introducing water into the rotary furnace requires complicated measures; the coal/water ratio has to be controlled very exactly, or else coal will remain in excess in the system and hinder self-disintegration. In addition the injection of water may disturb the thermal equilibrum of the furnace, and the arising gases $H_2$ and CO may cause explosion risk. All these problems can be eliminated by the process according to the present invention. The essence of the present invention is that the reduction of the compounds inhibiting self-disintegration is performed by admixing desoxidants having electrochemical activity, directly to the raw materials when adjusting their composition. These additives exert their effect at the clinkerizing temperature. Therefore small quantities — preferably 0.1 to 2.0 percent by weight — of desoxidants consisting of metallic components (Fe, Al, Si, Cu) are added to the starting materials, which metals coincide with the metal components of the metal oxides contained in the starting material. These metals can be employed by themselves and/or in form of alloys e.g., Fe-Si, Al-Si, Fe-Al, Fe-Al-Si, Ca-Si. Desoxidants exert their action by reducing the higher oxides present in small quantities and their oxidation does not result in ions having a decomposition impeding effect from an electrostatic point of view. Further studies proved that the β-modifications, which are very important from the point of view of disintegration, may not form without the formation of the γ modification but under special cooling conditions.

The process according to the present invention involves an appropriate treatment i.e., the clinker is cooled by means of a calculated quantity of air and/or water in such a way that temperature should decrease abruptly to the value corresponding to the formation of the β-modification i.e., to 675°–705°C. The clinker is then kept at this temperature until the dicalcium silicate completely is transformed into the β-modification. This modification, when being cooled further, changes over into modification γ which is a self-disintegrating product.

The obtained self-disintegrating product may be leached directly with a soda solution and from the solution alumina can be recovered whereas the extracted residue can be used in the production of hydraulic cement. The aluminum present in the water-insoluble form of 4 CaO·Fe$_2$O$_3$·Al$_2$O$_3$ is the only aluminum compound, which cannot be extracted by leaching with soda. On the basis of the Fe$_2$O$_3$-content of the clinker in a given case 3.5 to 4.0 percent of insoluble Al$_2$O$_3$ remains in the leaching residue. Thus the starting Al$_2$O$_3$ content of the clinker amounting in the given case to 15 percent decreases by leaching to 3.5–4 percent. The extraction residue itself can be considered as a raw material for hydraulic cement and when vitrified without any additives it results a poor or medium quality cement, depending on the ratio of the relatively high proportion of the belite content remaining in the β-modification after cooling.

The lime saturation degree of the material is low, therefore CaCO$_3$ is to be added in a quantity of about 20 percent, to obtain a good quality hydraulic cement. This hydraulic cement is a fast setting type with a high sulphate resistance owing to its relatively high iron and low alumina contents. Increasing the Fe$_2$O$_3$ content by 1.2 to 2.0 percent by weight a high hydraulic cement of high quality is obtained.

The process according to present invention may be illustrated by following Examples:

EXAMPLE 1

A quantity of 1,000 kg. of fly ash arising from a power plant, with a composition of 45.5 percent SiO$_2$, 29.4 percent Al$_2$O$_3$, 9.7 percent Fe$_2$O$_3$, 6.1 percent CaO, 1.3 percent MgO and 8.5 percent other components, and 2,100 kg. of limestone was ground together and a powdered Al-Si alloy of (40/60 rate) was added in a quantity of 20 kg. The ground and mixed material was pelletized and hereafter clinkerized in a rotary furnance. The highest temperature of the material in the furnance was 1,280°C. The clinker discharged from the furnace was quenched by adding 785 litres of water at a temperature of 700°C, and kept at the same temperature for 15 minutes. On cooling further, at a temperature of about 400°C, the clinker started to disintegrate and it soon crumbled into dust. The degree of disintegrating was determined by passing it through a sieve with openings of 2 mm, and it was found that only 6 percent of the whole quantity remains on the sieve. The screen material was suspended in a soda solution and the solids content of the suspension was adjusted to 250 g./l. The alumina values was extracted by means of soda solution of 50 g./l. at a temperature of 75°C, then the alumina solution was processed in a known way.

EXAMPLE 2

A quantity of 500 kg. of fly ash having the same composition as in Example 1, and 500 kg. of clay were mixed together. The composition of the mixture was as follows: 43.2 percent SiO$_2$, 31.1 percent Al$_2$O$_3$, 5.2 percent Fe$_2$O$_3$, 4.1 percent CaO, 9.8 percent water and 6.6 percent others. This mixture was ground together with 2,060 kg. of lime stone, thereafter a Fe-Al-Si alloy (15 percent + 45 percent + 40 percent) in a powdery form was added in a quantity of 1.5 kg. After pelletizing, the material was clinkerized in a rotary furnace at a temperature of 1,380°C. The clinker discharged from the furnace was cooled rapidly to a temperature between 680° and 700°C with wet-air spray, and kept at this temperature for 20 minutes. By further cooling, at a temperature of about 350° to 300°C the product disintegrated and the clinker was crumbled into dust. Having screened the disintegrated product on a sieve with openings of 2 mm. the quantity of sieve residue amounts to 4.8 percent. The screened material was extracted in the same way as disclosed in Example 1, and the extracted residue was upgraded by the addition of CaCO$_3$ in quantities of 20 percent calculated on the weight of the product and clinkerized to a hydraulic cement.

The advantage of the process according to present invention is that the production of materials containing dicalcium silicate, in which the dicalcium silicate has self-disintegrating character owing to the transformation of β → γ modification, can be controlled. The reduction of the metal oxides having high oxidation value inhibiting self-disintegration can be performed safely with the desoxidants proposed, as their use in excess quantities has no harmful effect on the self-disintegrating process. Desoxidants can be admixed to the starting materials at the beginning of the procedure, hence carrying out further complicated operations at the rotary furnace is unnecessary. According to present invention the utilization of raw materials otherwise unsuitable for aluminum extraction may become profitable too, since their aluminum content can be extracted and the residue can be used preferably for hydraulic cement production.

What we claim is:

1. A process for preparing a self-disintegrating product containing dicalcium silicate, which comprises preparing a mixture of a starting material which contains at least 10 percent SiO$_2$ and at least 2.5 percent Al$_2$O$_3$, a small amount of a desoxidant, and of CaCO$_3$ wherein the proportion of CaCO$_3$ to SiO$_2$ is one which ensures the formation of dicalcium silicate without that of tricalcium silicate and wherein said desoxidant contains at least one metallic component which is identical to at least one metallic constituent of said starting material, forming a clinker from said mixture by sintering at a temperature between about 1,250°C and about 1,420°C, and then rapidly cooling the clinker to a temperature between about 675°C and about 705°C at which the formation predominates of a crystalline modification which favors self-disintegration, and maintaining at said temperature until said formation is completed.

2. The process of claim 1, wherein said proportion of $CaCO_3$ to $SiO_2$ is a molar proportion from about 1.9 to about 2.2, said small amount of desoxidant is 0.1 to 2.

3. The process of claim 1, wherein the starting material is at least one of fly ash, bituminous shale, bauxite, red mud, and clay.

4. The process of claim 1, wherein said $CaCO_3$-containing material is from about 1.7 to about 2.2 parts of limestone per part of $SiO_2$ in the starting material, and from about 1.0 to about 1.4 parts of limestone per part of $Al_2O_3$.

5. The process of claim 1, wherein the desoxidant is at least one of aluminum, iron, silicon, and calcium, of an alloy of the foregoing.

* * * * *